United States Patent [19]

Jeter

[11] Patent Number: 4,951,776

[45] Date of Patent: Aug. 28, 1990

[54] VEHICLE ANTI-THEFT SYSTEM

[76] Inventor: Herman C. Jeter, 7718 S. Bennett, Chicago, Ill. 60649

[21] Appl. No.: 254,974

[22] Filed: Oct. 7, 1988

Related U.S. Application Data

[63] Continuation-in-part of Ser. No. 773,437, Sep. 6, 1985, Pat. No. 4,777,377.

[51] Int. Cl.$^5$ .............................................. B60R 25/08
[52] U.S. Cl. ........................................ 180/287; 303/89; 188/353
[58] Field of Search ................... 180/287; 251/125.15; 307/10.2; 303/89; 188/353

[56] References Cited

U.S. PATENT DOCUMENTS

| 2,038,289 | 4/1936 | Herbster | 251/129.15 |
| 3,174,502 | 3/1965 | Howarth et al. | 180/287 |
| 3,358,481 | 12/1967 | Roszkowski | 70/243 |
| 3,559,755 | 2/1971 | Pond | |
| 3,634,880 | 1/1972 | Hawkins | 180/287 |
| 3,803,551 | 4/1974 | Jordan | 180/287 |
| 3,882,959 | 5/1975 | Hsieh | |
| 4,196,939 | 4/1980 | Kavis | |
| 4,300,057 | 11/1981 | Crosas | 180/287 |
| 4,366,466 | 12/1982 | Lutz | |
| 4,438,752 | 3/1984 | Cheung | |
| 4,471,852 | 9/1984 | Schield et al. | |
| 4,540,154 | 9/1985 | Kolchinsky et al. | 251/129.15 |
| 4,790,345 | 12/1988 | Kolchinsky | 251/129.15 |

Primary Examiner—Charles A. Marmor
Assistant Examiner—Karin Tyson
Attorney, Agent, or Firm—Leonard J. Kalinowski

[57] ABSTRACT

A vehicle anti-theft system is activated by a magnetically coded card and associated card reader to activate a normally closed solenoid valve which is connected in the brake line to permit normal operation of the vehicle, the valve being closed when unoperated, preventing brake fluid to return to the master cylinder, whereby the brakes of the vehicle are locked, preventing operation of the vehicle. The valve has its fluid inlet connected to the brake line and its fluid outlet connected to the outlet of the master brake cylinder.

6 Claims, 3 Drawing Sheets

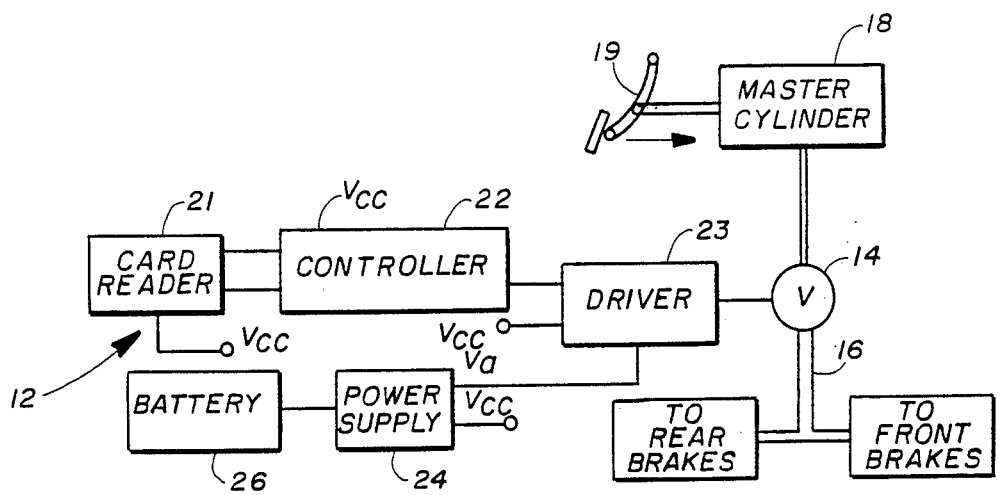
FIG.1
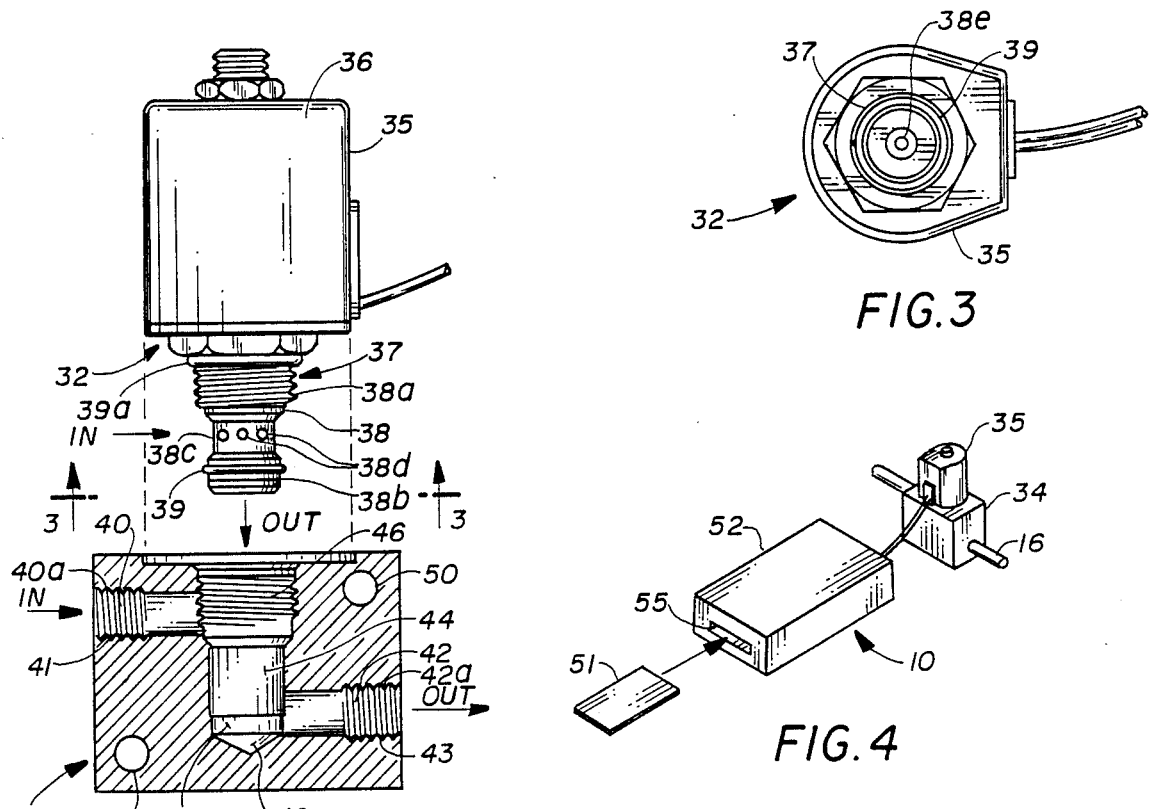
FIG.3
FIG.2
FIG.4

VEHICLE ANTI-THEFT SYSTEM

RELATED APPLICATION

This is a continuation-in-part of pending application Ser. No. 773,437, filed Sept. 6, 1985 and entitled VEHICLE ANTI-THEFT SYSTEM now U.S. Pat. No. 4,777,377.

BACKGROUND OF THE INVENTION

This invention relates to vehicle anti-theft systems, and more particularly to such systems in which a fluid valve temporarily disables a function of the vehicle, preventing operation of the vehicle.

Various vehicle anti-theft arrangements have been proposed in the prior art, the most common of which include ignition locks, steering wheel locks, and alarm devices which provide audible and/or visible alarm indications. It is well known that systems of these types are easily compromised, and thus, sophisticated control systems have been proposed. Such systems generally include electronically activated control devices which disable the vehicle exhaust or fuel line systems. The more sophisticated systems employ input devices which respond only to specifically coded signals to activate and deactivate the system.

For example, in U.S. Pat. No. 4,300,057 granted to Pedro Batlle Crosas, there is disclosed an anti-theft apparatus for vehicles in which a valve in a hydraulic return circuit of the braking system is activated by an electronic circuit set off by specific voltages acting as an electronic code. Although the locking means is activated and deactivated by using the electrical power source of the vehicle, maintenance of the wheels in a locked or unlocked condition is not directly related to the power source because the control valve includes a dual effect coil having two windings which can be switched state only by specific voltages which make up an electronic code which controls the switching of the valve.

Another automobile anti-theft system is disclosed in U.S. Pat. No. 3,358,481 issued to Gregory J. Roszkowski. In this system, a valve in the fuel line is operated by power from a converter circuit which is energized by means of special key which incorporates part of the converter circuit. This converter circuit prevents a thief from defeating the purpose of the system by using a jumper cable to connect the available power source directly to protection device itself.

SUMMARY OF THE INVENTION

The present invention provides a vehicle anti-theft system which includes an actuating means which controls a fluid valve of the system to temporarily disable a function of the vehicle, preventing operation of the vehicle.

In accordance with the invention, the vehicle anti-theft system comprises activating means for connecting an energizing signal to a device which is connected to control an operating system of the vehicle with which it is used, to prevent operation of the vehicle when desired. In particular, the device is a solenoid valve assembly which is connected to the hydraulic brake system. When in an energized condition, the valve is open and the brake system operates in a normal manner. When the valve is deenergized, the valve is closed and prevents release of the brakes, once the brakes are set, thereby preventing the vehicle from being driven. The vehicle anti-theft according to the present invention, when activated, does not engage the brakes, but rather prevents then from being released once they have been applied. The brake pressure will be released after an extended interval of time to eliminate undo stress on components of the brake system. However, if the system remains activated, as soon as the brakes are re-applied, they will lock even if power is disconnected from the activating means because disconnecting power from the activating means does not compromise the system. The activating means includes a non-volatile memory which stores the state of operation before power was lost. The system automatically resumes operation when power is returned.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a block diagram of a vehicle anti-theft system provided by the present invention;

FIG. 2 is a view of the solenoid cartridge valve for the vehicle anti-theft system provided by the present invention with the valve cartridge illustrated removed from the valve body which is shown in section;

FIG. 3 is a bottom view of the valve cartridge;

FIG. 4 is a perspective view of a control module and a code card of the vehicle anti-theft system of FIG. 3;

DESCRIPTION OF PREFERRED EMBODIMENTS

Figure 5:
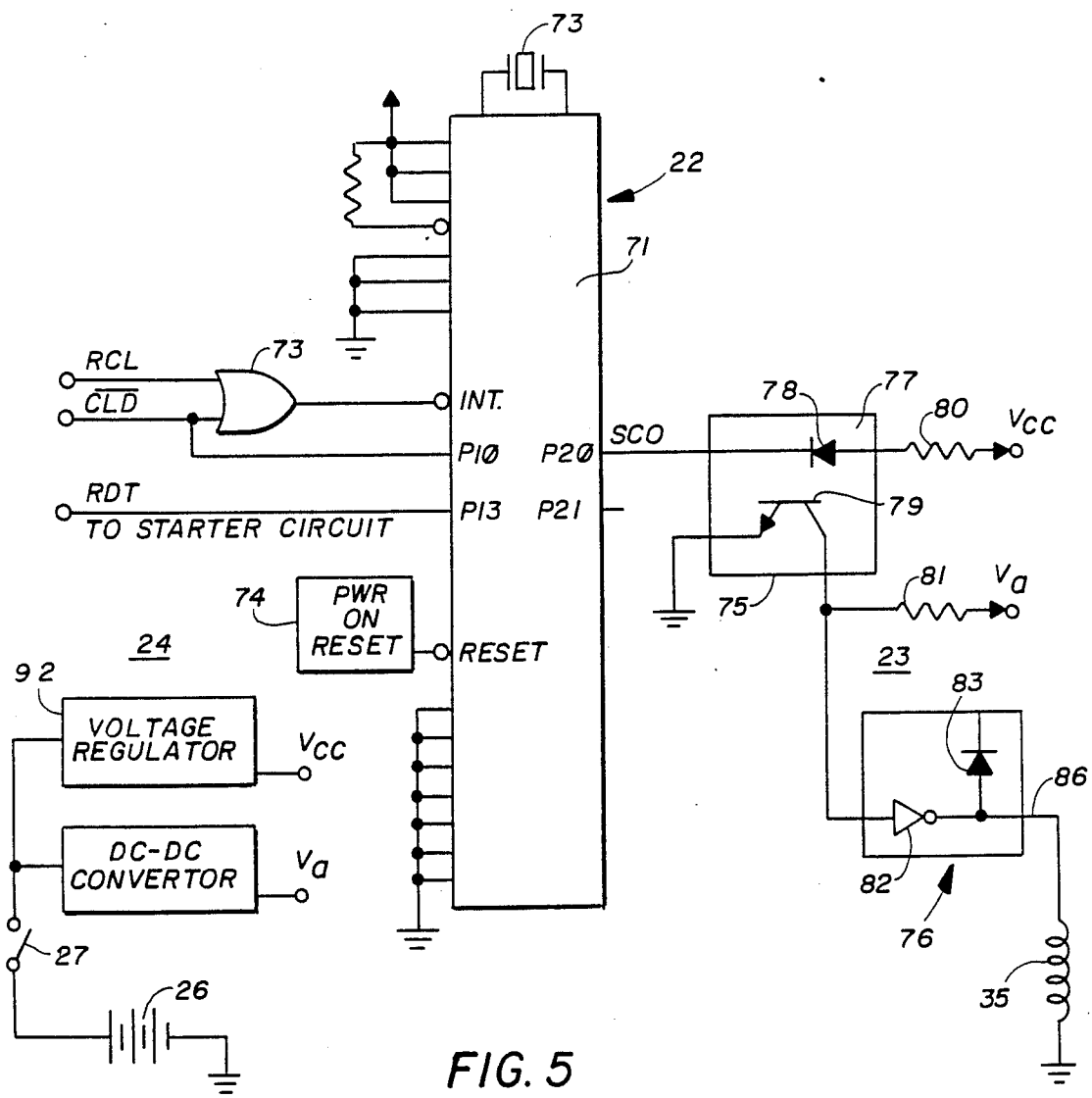
FIG. 5 is a schematic circuit and partial block diagram of the electrical circuits of the vehicle anti-theft system shown in FIG. 4.

Referring to FIG. 1 of the drawings, the vehicle anti-theft system 10 of the present invention includes a magnetic code card operated activating circuit 12 which controls a solenoid valve 14 for actuating the valve 14 to temporarily disable an operating function of the vehicle. The activating circuit 12 includes a card reader 21, a controller 22, a driver circuit 23 and a power supply circuit 24, which is energized by the vehicle battery 26. The valve 14 may be suitably connected to control the hydraulic brake system to lock wheel movement, connected to the fuel supply system to control fuel line shut off, and the like so as to disable the vehicle with which it is used.

In the disclosed embodiment, the valve 14 is connected in series with the hydraulic brake line 16 at the outlet 17 of the master brake cylinder 18 of a vehicle as illustrated in FIG. 1. In such arrangement, when brake pedal 19 is depressed to engage the brakes, the wheel of the vehicle are locked by the valve 14 holding pressure on the wheel cylinders which in turn maintains the brake shows or brake discs in locked position against the wheels or brake drums.

Referring to FIGS. 2 and 3, the valve 14 is configured for normally closed operation and, for example, may be the Model 850050 Solenoid cartridge valve, commercially available from Delta Power Hydraulic Company, Rockford, Ill. The valve 14, which is a poppet type valve, includes solenoid cartridge 32 and a body or manifold 34. The solenoid cartridge 32 includes a coil 35 (FIG. 5), contained within a valve housing 36 and a plunger 37 including a valve stem 38. The valve stem 38 has a threaded mounting portion 38a, a valve stem outlet portion 38b, and a necked down portion 38c formed with peripheral bores 38d defining an inlet for the valve stem. The bores 38d communicate with an axial bore 38e of the stem 38 which defines the outlet of the stem. The stem has o-rings 39 and 39a which seal the valve stem relative to the inner surface of the bore 44. The valve body 34 which is generally rectangular in shape, has a first transverse bore 40 defining a fluid inlet 41 for the valve, a second transverse bore 42 defining a fluid outlet 43 for the valve 14. The inner surfaces 40a and 42a of the bores 40 and 42 at the fluid inlet 41 and fluid outlet 43, respectively are threaded to receive the threaded ends of suitable fittings (not shown) to connect the valve in series with the master cylinder 18 (FIG. 1) and the brake line 16 (or lines) of the vehicle, in sealing relationship to prevent the loss of hydraulic fluid.

The valve body 34 further includes a vertical bore 44 in which the plunger 37 is located for reciprocating movement therewithin between flow preventing and flow permitting positions when the valve cartridge 32 is assembled with the valve body 34. The upper end 46 of the bore 44 communicates with the transverse bore 40. The bottom end 48 of the bore 44 communicates with transverse bore 42. The upper end 46 of the bore is tapped to receive the threaded portion 38a of the valve stem. The bottom end 48 of the bore defines a recess 49 axially lower than the transverse bore 42.

The valve 14 is a normally closed valve. Thus, when the coil 35 is deenergized, the plunger 37 is in its flow preventing position and that the inlet 41 is then maintained out of communication with the outlet 42 of the valve, preventing further fluid flow through the valve 14. In the flow permitting position, plunger 37 is driven upwardly, communcating the valve inlet and outlet, through the valve stem, enabling bidirectional fluid flow through the valve 14.

The plunger 37 is operated from its flow preventing position to its flow permitting position in response to application of a DC voltage of 12 volts to coil 35. When the coil 35 is energized, the plunger 37 is maintained in its flow permitting position, permitting fluid flow through the valve. When the coil is deenergized, the plunger 37 is restored to its flow preventing position.

In accordance with one aspect of the invention, the fluid inlet 41 of the valve 14 is connected to the hydraulic brake line 16 and the fluid outlet 43 of the valve 14 is connected to the outlet of the brake master cylinder 18. Accordingly, when the coil 35 of the normally closed valve 14 is deenergized, depressing of the brake pedal 19 will force brake fluid through the valve 14, tending to move the valve plunger 37 upwardly sufficiently towards it fluid flow permitting position so as to allow brake fluid to flow through the valve 14 to cause the brakes to be engaged. However, brake fluid flow in the reverse direction is prevented because the brake fluid will drive the valve plunger 37 towards its fluid flow preventing position.

In accordance with a feature of the invention, the valve 14 is characterized by a small leakage from inlet to outlet, of about five drops per minute. Thus, once engaged, the brake lock system will maintain the brakes engaged for an extended period of time, about one hour for example, at which time sufficient leakage will have occurred as to permit the brakes to release. This substantially eliminates undo stress on components of the brake system. However, as long as the system 10 is activated, as soon as the brakes are reapplied in response to a subsequent depressing of the brake pedal 19, the brakes will lock again.

Referring to FIGS. 1 and 4 of the drawings, in accordance with the present invention, the vehicle anti-theft system 10 comprises a magnetic card-operating activating circuit 12 which controls the energization of the valve solenoid to engage and lock the brake system of the vehicle. A code card 51 provides input control data to electronic circuits of the system 10, shown in block diagram in FIG. 1, which are housed within a suitable housing 52 (FIG. 4). The electronic circuits respond to the control data to provide control signals for operating the valve 14 for locking wheel movement by locking the brakes.

Considering the electronic circuits in more detail, by way of example, the card reader 21 may be the Panasonic type Z0-1852-ENA. The data card may provide a ten character code word which is factory coded in a manner known in the art. When the card is inserted into the card reader, the card reader provides a first output $\overline{CLD}$ indicating that a coded card has been inserted. When the characters have been read, the card reader provides an output RCL over one output line and the data representing the characters read over another line RDT.

Referring now to FIG. 5, the controller 22 is a microprocessor based controller including a microprocessor 91 operating under program control to receive and process data read from the data card 51. The microprocessor 71, which may be the Intel type 8749, receives the data read from the magnetic card 51 by the card reader 21 via input line RDT which is connected to an input port P13 of the microprocessor 71. Further outputs of the card reader 21 include $\overline{CLD}$ which indicates a card has been loaded into the card reader and over input RCL which indicates that the card has been read and that serial data is present on line RDT. The inputs $\overline{CLD}$ and RCL are extended through an OR gate 73 to the interrupt input of the microprocessor 71. Input $\overline{CLD}$ is also extended to a further input port P10 of the microprocessor 71 to enable the input to be temporarily stored in memory.

The microprocessor includes an internal stored program in ROM and further includes temporary memory or RAM for storing incoming data received at input ports P10 and P13. Timing for the microprocessor is derived from an external crystal 73. A power on reset circuit 74 responds to turning on of the ignition key to apply a reset signal via RESET input of the microprocessor 71 to initialize itself whenever the anti-theft system is actuated.

The microprocessor 71 stores in its memory a ten digit coded word corresponding to the code assigned to the system 10 and compares the incoming ten digit code word with the stored code word. When the received code word matches the stored code word, the microprocessor 71 provides an enabling signal SCO via output port P20 for activating the solenoid coil 36 of the valve 14.

Figure 6:
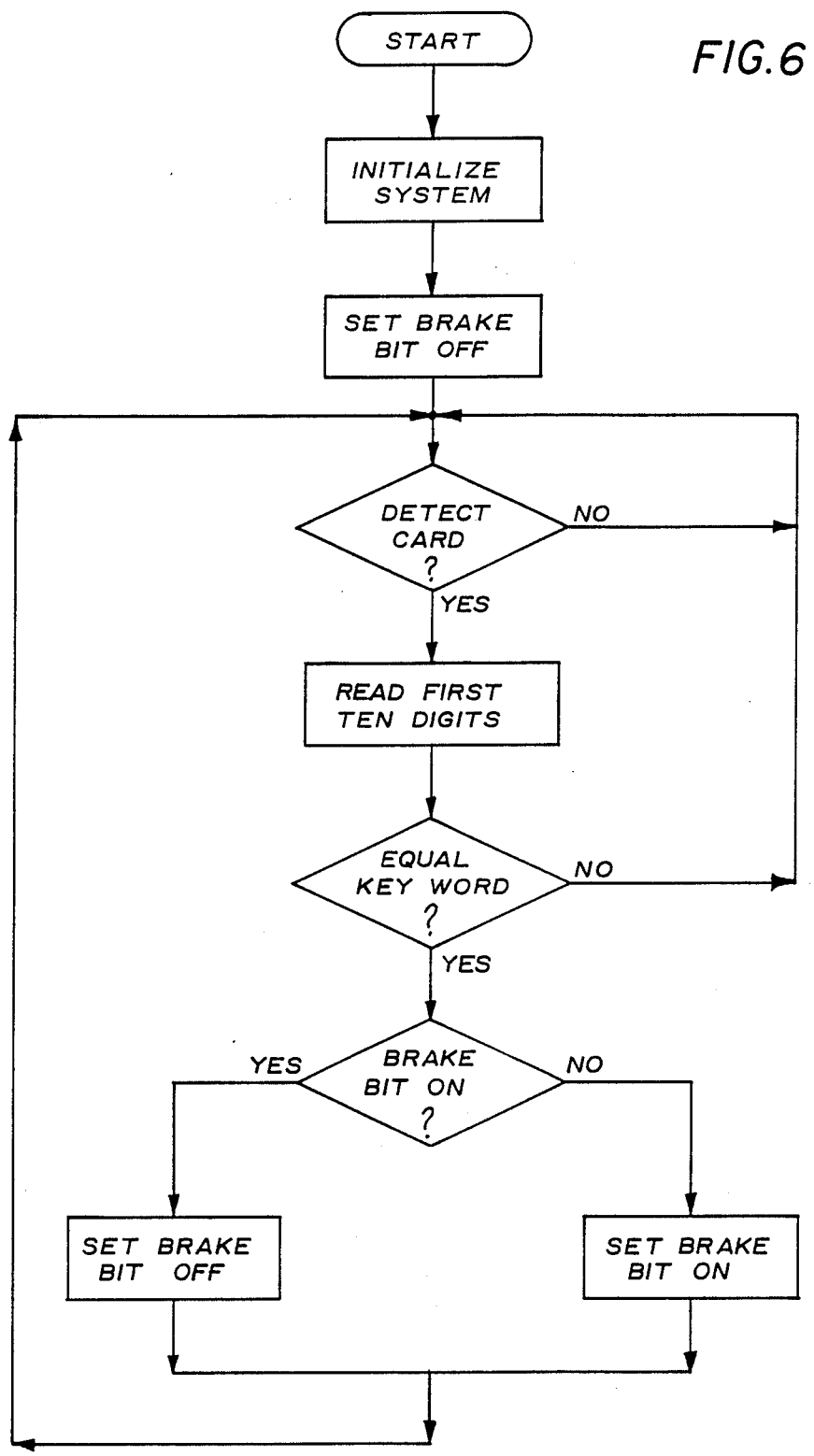
FIG. 6 is a process flow chart describing the operation of the system controller.

Referring to FIG. 6, there is illustrated the program flow chart for the operating program for the microprocessor 71. When power is first applied to the system 10, the system initialized itself, clearing registers, etc. and sets the brake bit to the off state.

Once energized, the system will set in a loop waiting for a data card 51 to be inserted into the card reader 21. After a data card is detected, an attempt is made to read the first ten digits. If the read operation was successful and the code word compares with the stored code word, the brake bit will be set on by setting high output SCO to energize the coil 36 of the valve 14. The program then loops back and waits for subsequent reinsertion and detection of a data card. When a card is subsequently detected and the key word compares with the stored code word, the brake bit will be set to the "off" state, enabling the valve 14 to be operated.

The output signal SCO provided by the microprocessor 71 is extended to the driver circuit 23. The driver circuit 23 includes activating branch 75 which includes an opto-isolator stage 77, and an output stage 76. The opto-isolator stage 77 converts or transfers the logic DC voltage level from the microprocessor 71 to the battery voltage level at 12 VDC. In an actual embodiment, the opto-isolator was the General Instrument type CNY 65 Opto-Isolator. The opto-isolator, which operates at voltage level Vcc, includes a light emitting diode 78 and a phototransistor 79. The anode of the light emitting diode 78 is connected through a resistor 80 to voltage Vcc and the cathode of the diode is connected to output line SCO of the microprocessor 71. Phototransistor 79 is connected through resistor 81 to the voltage Va and the emitter of transistor 79 is connected to ground (or the negative battery terminal). In an actual embodiment, the output stage was a type 2086 driver circuit. The driver circuit includes an inverter 82 and an isolation diode 83. The input of inverter 82 is connected to the collector of phototransistor 79 and drives output line 86 which is connected valve coil 36.

The output of the drive circuit is normally held at a ground potential. When the microprocessor 71 provides output SCO, indicating that the system is to be activated, a pulse is provided on line SCO which enables opto-isolator 77 which grounds the input to output driver circuit 76 causing it to produce a DC level at 12 VDC on conductor 86. The time duration of the output pulse provided by the microprocessor 71 may be sufficient to maintain the solenoid coil energized, or the output pulse may enable an output latching circuit (not shown) to maintain the valve coil 36 energized.

The power supply circuit 24 is connected to vehicle battery 26 and includes a suitable voltage regulator circuit 92, such as the type TL 497 regulator chip, which derives a regulated voltage Vcc for the electronic circuits of the system 10.

Considering the operation of the vehicle anti-theft system 10 with reference to FIGS. 1, 5 and 6, it is assumed initially that the system 10 is de-activated such that the valve 14 is deenergized and thus closed. If the brake pedal 19 has recently been depressed, i.e. within the past hour or if the brake pedal is depressed at this time, brake fluid is forced through the valve 14 from its outlet 43 to its inlet 41 to the brake line 16, and the brakes are engaged and lock all four wheels of the vehicle.

When the ignition key is operated to start the vehicle, power from the battery 26 is connected to the power supply circuit 24, a power on reset signal is supplied to the microprocessor 71 via its reset input, resetting the microprocessor for initializing it. Also, DC voltage is applied to the card reader 21 and driver circuit 23.

When a data card 51 is inserted into card reader 21 through slot 55 of the housing, the card reader outputs signal $\overline{\text{CLD}}$ (FIG. 5) to the interrupt input of the microprocessor 71 and to its input port P10. The card reader 71 then reads the data card and outputs a serial pulse train over data line RDT to input port P13 of the microprocessor 71, the microprocessor sampling its input port P13 to read in the data bits and store the data word in RAM.

After all of the bits representing ten digit security code have been received and stored, the microprocessor compares the received data with the stored code word and if a match is determined, the microprocessor 91 outputs a signal on line SCO, enabling the driver circuit 23 to apply 12 volts DC on output conductor 86 for energizing the valve coil 36. This causes valve 14 to operate and establish bidirectional flow through the valve to release the brakes, if they are set, and allow the vehicle to be driven.

A similar sequence of events is followed to activate the system when the vehicle is subsequently parked. To activate the system, assuming the ignition key is operated to the on position so that the system is energized, the operator inserts the card 51 into the card reader 21, and as described above, the microprocessor 71 responds to interrupts generated by the card reader to read the serial data supplied by the card reader, compares the received data with the stored data and outputs a signal on line SCO to deactivate the valve coil 36 to release the plunger 37 (FIG. 2) from its flow permitting position allowing it to return to its flow blocking position. The operator then depresses the brake pedal 19 to force hydraulic fluid through the valve to activate the brake cylinders to drive the brake shoes and/or discs into engagement with the brake drums on the wheels. The valve 14 prevents the reverse flow of hydraulic fluid from the brake lines to the master cylinder so that the vehicle brake system is locked on.

I claim:

1. In an anti-theft system for a vehicle, said vehicle having an hydraulic brake system including a master brake cylinder and a brake line connected to the outlet of the master brake cylinder, the combination comprising: valve means having a fluid flow inlet, a fluid flow outlet, and an operating coil, said valve means being connected in series with the brake line near the outlet of the master brake cylinder for interrupting the operation of the brake system, said valve means having said fluid flow inlet connected to said brake line and said fluid flow outlet connected to an outlet of said master brake cylinder, said valve means including a valve body having a fluid flow passageway therethrough, and fluid flow control means in said passageway to permit fluid flow through said valve means from said fluid flow outlet to said fluid flow inlet while said valve means is unoperated, thereby permitting brake fluid to be transferred from said master cylinder to said brake line while said valve means is unoperated, said flow control means including a valve stem having a fluid flow passage therethrough, said valve stem including plunger means movable within said passageway between flow preventing and flow permitting positions, and sealing means sealing said valve stem relative to inner surfaces of passageway, and activating means coupled to said operating coil of said valve means for operating said valve means to move said plunger means to its flow permitting position, said valve means, when operated, enabling bidirectional flow of brake fluid between the master cylinder and the brake line, and when said valve means is unoperated said plunger means is at its flow preventing position, preventing the flow of brake fluid from said fluid flow inlet to said fluid flow outlet, thereby preventing release of the brakes, once set, until said valve means is subsequently operated, and said valve stem being constructed and arranged to permit leakage of brake fluid therethrough from said fluid flow inlet to said fluid flow outlet at a rate to provide release of the brakes, once set, after an extended period of time.

2. A system according to claim 1, wherein said period of time is on the order of about one hour.

3. A system according to claim 1, wherein said valve body has a first fluid passageway communicating with said valve fluid inlet, a second fluid passageway communicating with said valve fluid outlet, and a third fluid passageway extending normal to said first and second passageways communicating said first and second fluid passageways, said valve stem being located within said third passageway.

4. In an anti-theft system for a vehicle having an hydraulic brake system including a master brake cylinder, and a brake line connected to the outlet of the master brake cylinder, the combination comprising: valve means, said valve means having a fluid flow inlet and a fluid flow outlet, and an operating coil, and activating means including a member bearing magnetically coded data representing a security code, a code reader for receiving said coded member for reading coded data and to provide a series of data signals representing the coded data, controller means for receiving the series of data signals and comparing the received data signals with stored data signals corresponding to said security code, said controller means providing a control signal whenever the received data signals correspond to the stored data signals, and drive means coupled to said controller means and to said operating coil of said valve means, said valve means being connected in series with the brake line near the outlet of the master brake cylinder with said valve fluid flow inlet connected to the brake line and said fluid flow outlet connected to the outlet of the master brake cylinder, said valve means including a valve body having a fluid flow passageway therethrough, and fluid flow control means in said passageway to permit fluid flow through said valve means from said fluid flow outlet to said fluid flow inlet while said valve means is unoperated, thereby permitting brake fluid to be transferred from said master cylinder to said brake line while said valve means is unoperated, said flow control means including a valve stem having a fluid flow passage therethrough, said valve stem including plunger means movable within said passageway between flow preventing and flow permitting positions, and sealing means sealing said valve stem relative to inner surfaces of passageway, said drive means being responsive to said control signal to energize said valve operating coil to operate said valve means to move said plunger means to its flow permitting position to permit bidirectional flow of brake fluid between said fluid flow inlet and said fluid flow outlet thereby permitting brake fluid to flow between the master cylinder and the brake line, and in the absence of said control signal, said valve means being unoperated and said plunger means being at its flow preventing position, thereby preventing fluid flow from said fluid flow inlet and the brake line connected thereto to said fluid flow outlet and the master cylinder connected thereto, said valve stem being constructed and arranged to permit leakage of fluid therethrough from said valve fluid flow inlet to said valve fluid flow outlet at a rate to provide release of the brakes, once set, after an extended period of time.

5. A system according to claim 4, wherein said period of time is on the order of about one hour.

6. A system according to claim 4, wherein said valve body has a first fluid passageway communicating with said valve fluid inlet, a second fluid passageway communicating with said valve fluid outlet, and a third fluid passageway extending normal to said first and second passageways communicating said first and second fluid passageways, said valve stem being located within said third passageway.

* * * * *